United States Patent
Papai

[11] 3,883,079
[45] May 13, 1975

[54] PASTRY SHELL FILLING APPARATUS

[76] Inventor: Imre F. Papai, 2818 E. 119 St., Cleveland, Ohio 44120

[22] Filed: Oct. 1, 1973

[21] Appl. No.: 402,475

Related U.S. Application Data

[62] Division of Ser. No. 250,933, May 8, 1972, Pat. No. 3,780,643.

[52] U.S. Cl. .............................. 241/94; 241/273.1
[51] Int. Cl. ....................... A47j 44/00; B02c 18/02
[58] Field of Search ......... 241/83, 94, 95, 262, 263, 241/266, 273.1, 274; 83/622

[56] References Cited
UNITED STATES PATENTS

| | | | |
|---|---|---|---|
| 466,183 | 12/1891 | Patten | 241/94 X |
| 2,088,298 | 7/1937 | Cove | 83/622 X |
| 2,583,595 | 1/1952 | Rodel et al. | 241/94 X |
| 2,604,915 | 7/1952 | Beavers | 241/94 X |

*Primary Examiner*—Roy Lake
*Assistant Examiner*—E. F. Desmond
*Attorney, Agent, or Firm*—McNenny, Farrington, Pearne & Gordon

[57] ABSTRACT

There is provided apparatus for applying a grated foodstuff, e.g., cheese from brick cheese bodies, characterized by a movable holder for gravity or forced feeding of the foodstuff and a stationary grate.

4 Claims, 9 Drawing Figures

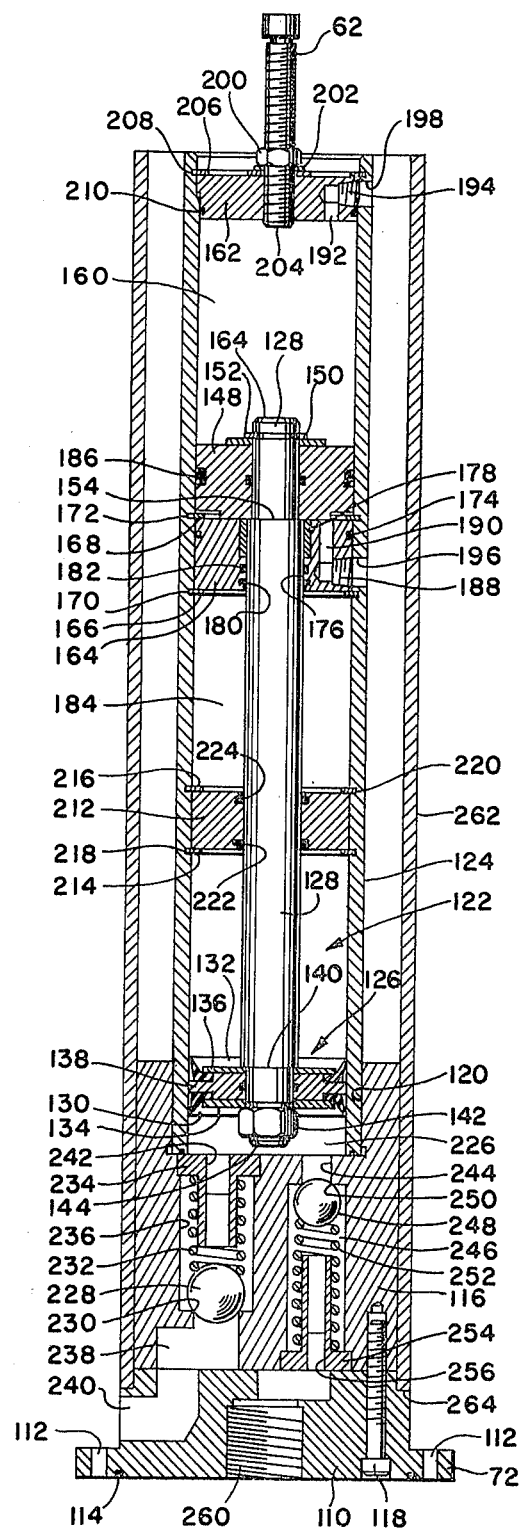

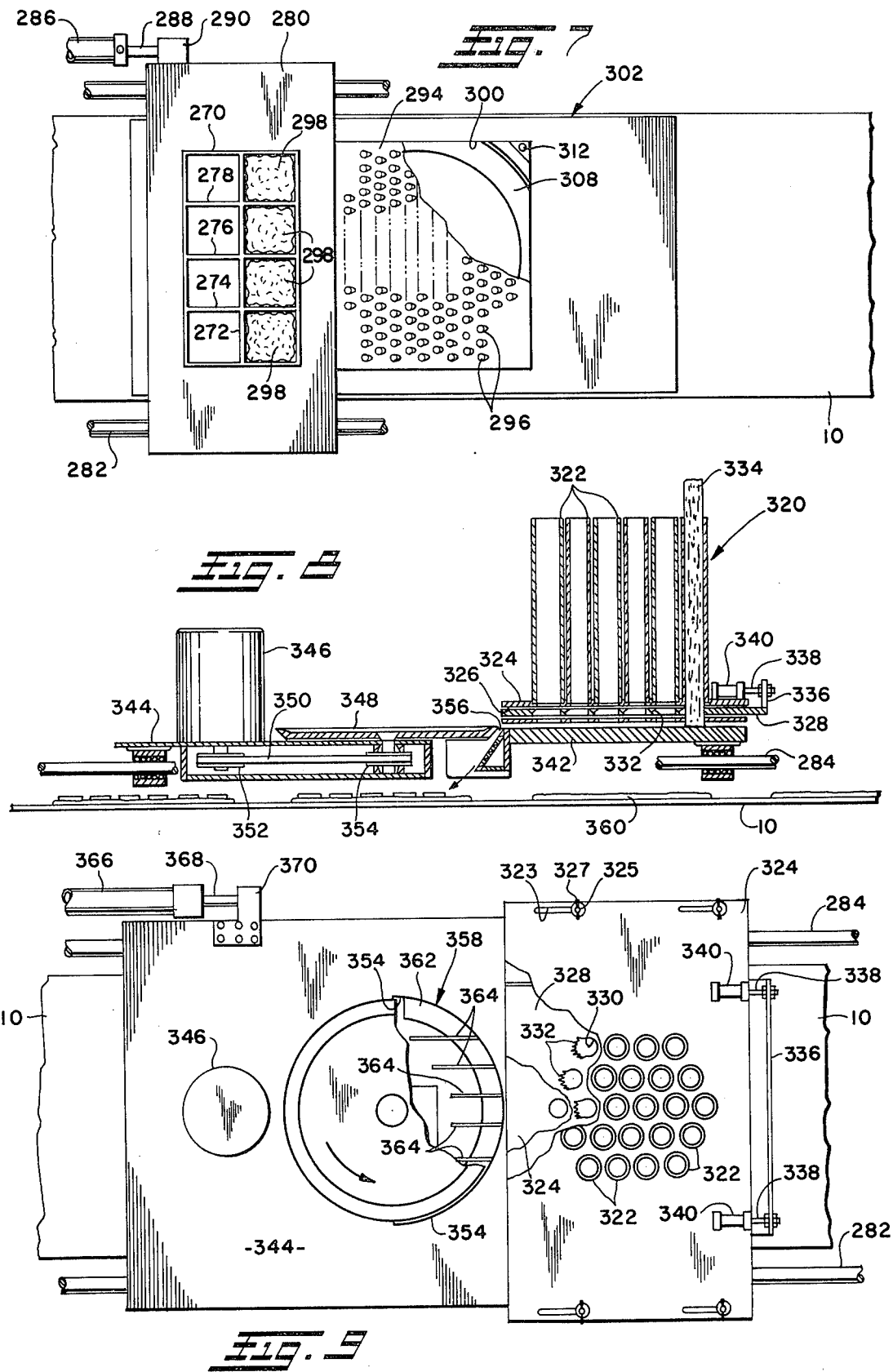

PASTRY SHELL FILLING APPARATUS

RELATED APPLICATION

This application is a division of my copending application Ser. No. 250,933 filed May 8, 1972, now U.S. Pat. No. 3,780,643 dated Dec. 25, 1973.

BACKGROUND OF THE INVENTION AND PRIOR ART

The present invention relates to equipment for filling pastry shells, and more particularly pizza shells, with foodstuffs from successive stations, e.g., tomato paste, grated cheese, and sausage meat. Various proposals have from time to time been made for machines adapted to fill pastry shells automatically and in replacement of some operations formerly done by hand. In the manufacture of pizzas, for example, many of the filling operations are still done by hand. Production rate and uniformity of the product may both be improved where such operations are performed mechanically.

Previous machines have performed operations such as making and prebaking pastry shells, for example as shown in U.S. Pat. Nos. 3,392,687 and 3,379,141. The present equipment may be utilized in conjunction with automatic machinery for making and prebaking pastry shells. Various suggestions for dispensing foodstuffs have been made, representative examples being U.S. Pat. No. 3,505,963 for dispensing sausage and U.S. Pat. No. 3,136,268 for dispensing several foodstuff items in sequence for filling pies.

BRIEF DESCRIPTION OF THE DRAWINGS

The invention may be better understood by having reference to the annexed drawings wherein:

FIG. 3 is a plan view of a nondrip paste-distributing head in accordance herewith.

FIG. 4 is a cross-sectional view of the distributing head as shown in FIG. 3 as it appears in the plane indicated by the line 4—4 in FIG. 3.

FIG. 5 is cross-sectional view of a single-acting pump suitable for pumping a measured quantity of paste material from a supply source (not shown) through a distributing head such as shown in FIGS. 3 and 4.

FIG. 7 is a top plan view, partially cut away, of the station shown in FIG. 6.

FIG. 8 is a schematic and diagrammatic partially cut-away cross-sectional view of a station for applying a sliced meat product to pastry goods characterized by a movable rotating knife and chute assembly and a stationary meat product holder in material-applying relation to an indexing conveyor.

FIG. 9 is a top plan view, partially cut away, of the station shown in FIG. 8.

BRIEF STATEMENT OF THE INVENTION

Briefly stated, the present invention is in an apparatus for filling pastry shells, and particularly pizza shells, and in the individual means for dispensing foodstuff material. The entire apparatus for topping pizza shells is characterized by pastry shell-supporting means and a plurality of relatively movable foodstuff-applying stations, e.g., tomato sauce, grated cheese, and sliced pepperoni. Each of these stations includes applying means for the associated ingredient. The apparatus also includes means for intermittently relatively moving the shell-supporting means and the ingredient-applying means such that each shell is sequentially exposed to each applying station in a programmed manner. The initial paste of sauce-applying means, e.g., means for applying tomato sauce for pizza shells, comprises a dispensing head formed as a horizontally disposed shallow cylindrical chamber having a central inlet feed passage, a pump adjacent the central feed passage, and means for supplying dispensible paste foodstuff material to such pump, said dispensing head having a plurality of orifices, said orifices being progressively larger in size as their radial distance from the center of the dispensing head increases. The axial length of the orifice is so related to the hydrostatic head of paste material above the orifice and within the dispensing head that liquid forces within the spout bores prevent dripping of the paste material therefrom after expulsion of a charge of predetermined size.

A subsequent station, e.g., a grated cheese applying station, is characterized by a grate member and a relatively movable housing for carrying a gratable foodstuff. Means are provided for relatively moving the housing and the grate. In more specific embodiments, means are provided for imposing a bias between the grate and the lower portion of the gratable material-supporting housing whereby as the housing advances relative to the grate member, the trailing edge of the grate is effectively elevated with respect to the bottom of the housing member. This improves the grating action. Means may also be provided for cleaning the cusps of the grating device.

A sliced sausage dispenser comprises a holder and, relatively movable with respect thereto, a rotating knife together with chute means for controlling the distribution of sausage slices.

DETAILED DESCRIPTION OF THE DRAWINGS

Figure 1:
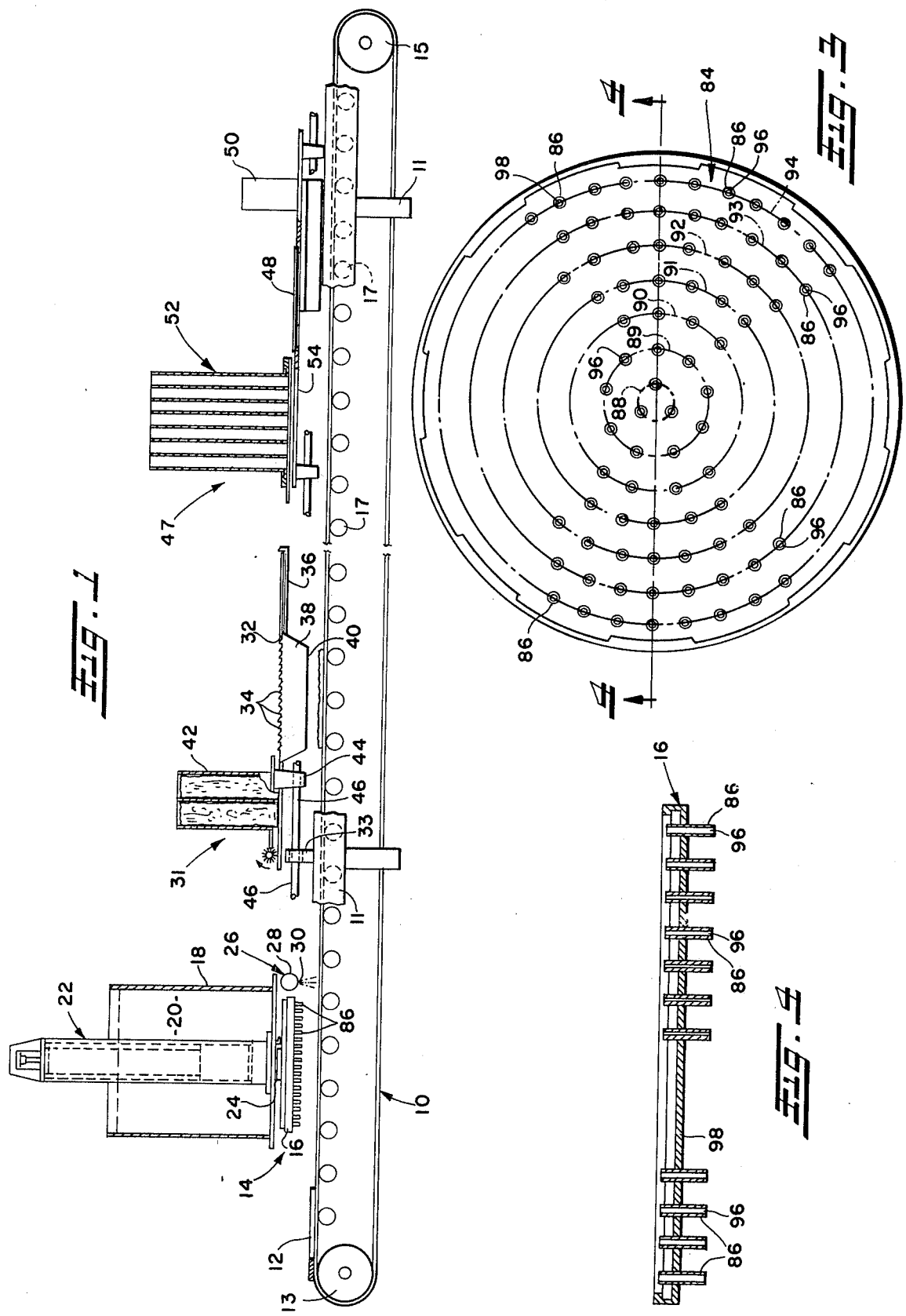
FIG. 1 is a schematic and diagrammatic side elevation of a pastry shell filling machine in accordance with this invention and showing an indexing conveyor belt and separate stations for sequentially applying to a shell individual filling ingredients.

FIG. 1 is a diagrammatic and schematic side elevation of an embodiment of the present invention in the form of a pizza topping apparatus for filling pizza shells with foodstuffs. It comprises an indexing conveyor and a plurality of foodstuff-applying stations at predetermined locations. In the illustrated embodiment, there are provided a tomato paste-applying station, a grated cheese-applying station, and finally a sliced pepperoni-applying station. The means for positioning the pizza shells onto the conveyor form no part of the present invention. This operation may be performed by hand with the aid of an adjustable shell locator or by automatic machinery. Also, the operation of removal of the filled shells from the machine forms no part of this invention and may be done by hand or by machinery. Although three foodstuff-applying stations are shown and described herein, it will be understood that additional foodstuff-applying stations may be introduced as well as additional operations, e.g., pastry shell-loading means, additional foodstuff-applying means, baking means, packaging means, freezing means, etc.

Figure 2:
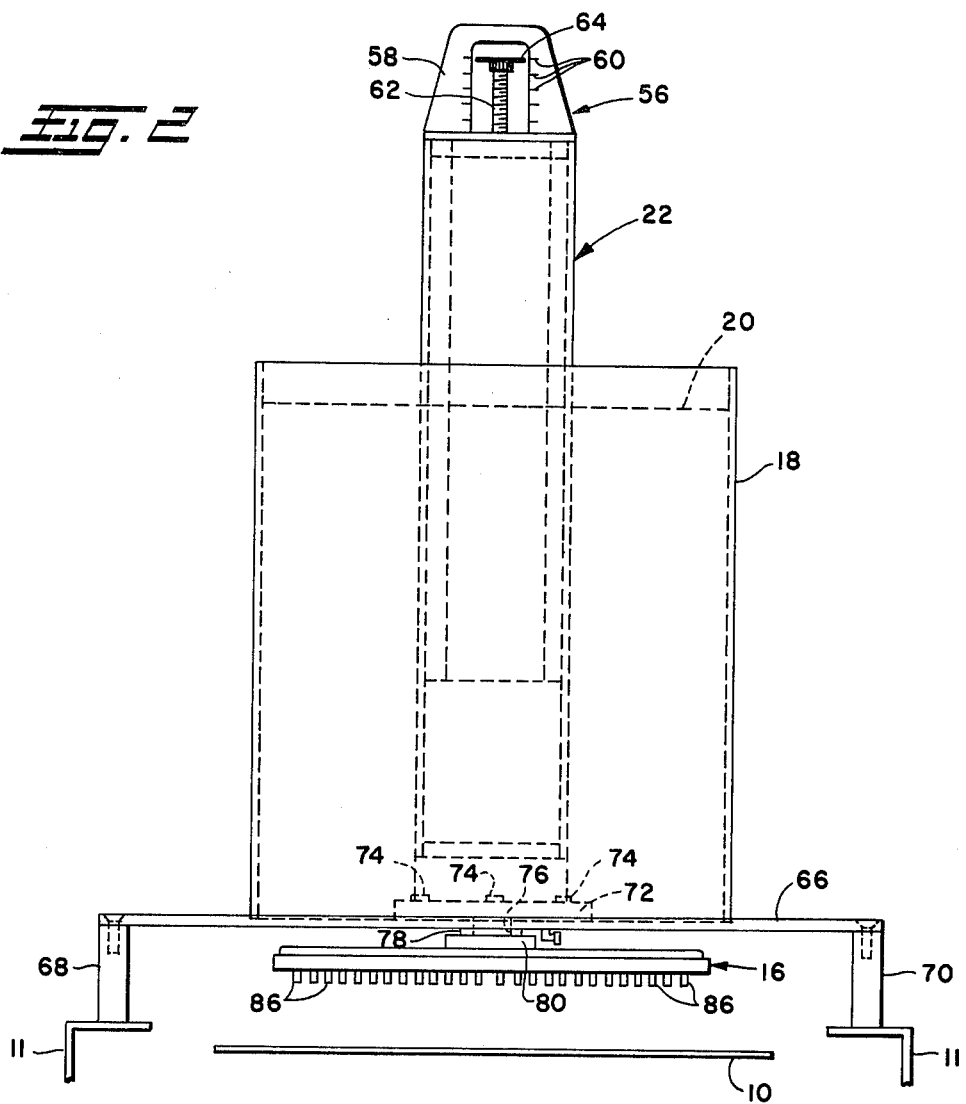
FIG. 2 is a schematic and diagrammatic front elevation of a station for applying a paste-like ingredient to pastry shells characterized by a pump and a distributing head in material-applying relation to an indexing conveyor.

Referring now more particularly to FIG. 1, there is here shown a roller-supported indexing conveyor belt 10 carried on a frame 11 FIG. 2) adapted for programmed intermittent movement from left to right, and having an adjustable pastry shell indexing form or locator 12 mounted on the conveyor frame 11 for locating pizza shells of a range of sizes on the conveyor belt when at rest. The mechanism of the conveyor itself may be any known structure including a head pulley 13 and a tail pulley 15 and intermediate supporting rollers 17, all mounted on the frame 11 and having means for moving it a predetermined distance, e.g., 16 inches, and then arresting its movement during a given filling operation. Accordingly, the programming means and the circuitry for indexing will not be described in detail. The conveyor 10 may be a linear, endless, flexible belt as depicted in FIG. 1, or it may be circular wherein the shells move in a horizontally disposed circular path.

The first station encountered by partially baked pizza shells carried at regularly spaced intervals on the belt 10 is a tomato paste filling station generally indicated at 14. The station 14 includes a nondrip dispensing head 16 (more fully described below with reference to FIGS. 2, 3, and 4) stationarily superposed above the conveyor 10 and supported from the underside of a storage vessel 18 containing a supply of tomato paste 20. The diameter of the dispensing head 16 will depend upon the diameter of the shell being filled and may, therefore, vary to accommodate the currently commercial range of from 6 to 14 inches. A pump 22 more fully detailed in FIG. 5 is provided for transferring paste from vessel 18 to dispensing head 16, through a coupler 24. The dispensing head 16 is removable for cleaning and for replacement with a head of different diameter as may be required by the diameter of the shell being filled. Immediately following the application of a paste-like material, it has been found desirable to provide means for evenly spreading the paste over the surface of the pastry shell. To this end there may be provided an air curtain 26 which is conveniently formed of a conduit 28 for pressurized air having an elongated slit 30 (or orifices) along its bottom side for directing an air curtain downwardly and through which the paste-filled shell must pass. A blast of air is directed toward the surface of sufficient force to spread the paste should it be piled in the regions just opposite the dispensing nozzle or nipples, but of insufficient force to cause splattering or removal from the shell. The correct air blast is experimentally determined and manually set for each run as it will vary with the paste used.

The second station encountered by the partially baked pizza shells is generally indicated at 31 and is adapted to dispense to the exposed surface of a located conveyor-supported shell a grated foodstuff, e.g., grated cheese. In the preferred embodiment diagrammatically shown in FIG. 1, the second station 31 includes a stationary cheese grater 32 having a plurality of cusps 34 projecting upwardly therefrom in the manner of known cheese grating devices. The cheese grater is removably supported on a stationary member 36 which also supports in depending manner therefrom a funnel form chute 38, the lower marginal edge 40 of which is configured for deposition of grated material onto a pastry shell, such as a circular pizza shell. A brick cheese holder 42 is mounted on laterally disposed slide blocks, e.g., slide block 44, for movement relative to the cheese grater 32 along guide bars, e.g., guide bar 46, which are in turn supported by the frame 11 as by a support post 33. As will be described in greater detail with reference to FIGS. 6 and 7, relative movement of the cheese grater and the holder 42 may be effected pneumatically.

With further reference to FIG. 1, the partially filled pastry shells located on the conveyor 10 are then indexed to the next station 51 which, in the embodiment shown, is for the purpose of applying sliced sausage meat, e.g., pepperoni. The apparatus for this purpose comprises in relatively movable relationship a rotatable knife 48 driven by a motor 50, and a sausage holder and guide 52. A holder plate 54 is provided in leading relation to the knife so that as relative movement between the two parts, e.g., the holder 52 and the knife 48, occurs, the plate 54 exposes a section of the sausage to the rotating knife 48 upon movement in the cutting direction and is returned to a holding position on relative retraction of the knife 48, thereby preventing the sausages within the holder 52 from dropping through. The specific apparatus is better shown in FIGS. 8 and 9 and will be described in detail later.

Relative movement of the cheese holder 42 and the grate 32 and relative movement of the sausage holder 52 and the knife 48 is conveniently effected by means of pneumatic piston/cylinder extensible arm assemblies having one end secured to the frame 11 and the other operatively contacting the element to be moved. Because of the normal very rapid response of pneumatic cylinders, shock absorbing means or dash pots may be used. The installation of such means is conventional and readily perceived by those skilled in the art. Although penumatic means are preferred, hydraulic, electrical, or mechanical means for effecting relative movements as above indicated and for indexing movement of the conveyor belt 10 may be used as will be apparent to those skilled in the art of machine movements and design.

In operation, then, in the production of filled pizzas, partially baked pizza shells are manually disposed on indexing conveyor 10 using locator 12. The located shell is then indexed to a predetermined position under the tomato paste-dispensing head 16. In response to pneumatic or other programming means sensitive to the location of a partially baked shell in paste-receiving position beneath the dispensing head 16, a measured charge of tomato paste is forcibly expressed through the dispensing head 16 onto the surface of the pastry shell. Because of the viscosity of some paste materials and their relative inability to flow, it may be found desirable to provide spreading means such as an air curtain device 26 which projects a blast of air onto the paste-filled surface to level the dispensed paste as the filled shell moves along the conveyor 10 to the next indexing point, e.g., the grated cheese applying station.

When the shell has arrived at this station, and in pneumatically controlled response to its location in grated cheese receiving position thereunder, the pneumatic motivating means for moving the cheese housing 42 across the stationary cheese grater 32 is actuated.

As will hereinafter more particularly described with reference to FIGS. 6 and 7, means are provided for ensuring proper feed of grated cheese. Also, means in the form of a wire brush rotating in a manner to release any cheese adhering to the top edges of the grater cusps 34 may be provided. After completion of the cheese application operation, the partially filled pizza shell is indexed in response to pneumatic signal to the next station for application of sliced sausage meat.

As briefly indicated above, the sausage holder 52 is then pneumatically actuated to move relatively to the motor driven rotating knife 48 to successively slice from a plurality of vertically suported sausages disposed in a predetermined pattern within the holder 52 for disposition upon the surface of the partially filled shell. Upon completion of the sausage slicing cycle, the conveyor 10 is again pneumatically actuated to index the sequence of shells to a point where the sausage-filled pizza shell may be removed either manually or automatically from the end of the conveyor 10 for such further operation as may be desired. In practice, the shells are wrapped and frozen and stored for subsequent use.

Having described a general arrangement of a pizza shell filling machine in accordance with the present invention, it becomes convenient at this point to describe in greater detail specific embodiments of the separate filling stations contemplated hereby.

THE PASTE APPLYING STATION

FIG. 2 is a schematic and diagrammatic front elevation of a station for applying a predetermined amount of a paste-like ingredient to pastry shells and characterized by an adjustable charge distributing pump apparatus 22 (details of an embodiment of which are more fully shown in FIG. 5) and a distributing head 16 shown in greater detail in FIGS. 3 and 4. The pump 22 is conveniently fabricated of Plexiglass or other suitable material, e.g., stainless steel, and is provided at its distal extremity with a cover member 56 including an upstanding graded U-shaped guard member 58 and including graduations 60 representative of different diameter pastry shells to be filled. As will be more clearly pointed out with reference to FIG. 5, an adjustable threaded shaft 62 coacting with the cover 56 and carrying indexing member 64 at its distal extremity enables adjustment of the stroke of the pump and hence the volume of paste-like material discharged thereby. As previously indicated, the paste charge is carried in a storage vessel 18 suitably supported in surrounding relation to the pump 22 which is immersed in the paste material. The storage vessel rests upon platform 66 suitably secured to supporting side rails 68 and 70 which are in turn carried by the frame 11 of the conveyor structure and suitably spaced therefrom to allow passage of the partially baked pastry shells thereunder. The pump 22 contained within the storage vessel 18 is secured to the platform 66 by means of a flange 72 and flange bolts 74.

A conduit 76 extends through the platform 66 for passage of paste-like material into the head 16. A threaded collar 78 is secured to the bottom of platform 66 in any convenient manner and provides means for threaded attachment of the head 16 thereto by means of internally threaded mounting collar 80 suitably secured to the top plate 82 of head 16. As will be better seen by having reference to FIGS. 3 and 4, the head 16 is composed of a shallow horizontally disposed chamber closed at its lower surface with a shower head member 84 having downwardly projecting therefrom a plurality of individual spouts or nozzles 86 having orifices 96. The nozzles 86 are preferably disposed at uniformly spaced intervals about the circumference of a plurality of circles of regularly decreasing diameter. The difference between successfully decreasing radii is about the circumferential spacing of the individual spouts 86 in any given ring. In the embodiment shown there are provided seven concentric rings 88, 89, 90, 91, 92, 93, and 94. Ring 94 contains 40 spouts uniformly spaced thereabout having a length of 1 inch and an I.D. orifice of 0.125 inch. Ring 93 contains 34 spouts; ring 92, 28; ring 91, 22; ring 90, 15; ring 89, nine; and ring 88, three. It should also be noted that in the particular embodiment shown the internal diameter of the spouts 86 in the ring 88 is 0.065 inch. The internal diameter of the spouts in each succeeding ring increases about 0.010 inch so that the internal diameter of the spouts in the ring 94 is 0.125 inch. This is to account for the fact that the pressure imposed upon the paste immediately opposite the pump entrance is greater at the center than it is at the outer periphery of the head, the paste material undergoing a pressure drop as the distance from the center increases. In order to more nearly equalize the the quantity of paste distributed from each nozzle 86, it is necessary to increase the diameter of the orifice 96. The foregoing dimensions are cited as indicative of those useful for a standard tomato paste for pizza filling.

It is also desired to take advantage of the capillary forces existing between a column of paste material and the surface of a given spout 86 to minimize dripping after the expression of a charge of predetermined size. To achieve this end, the axial length of the spouts 86 is adjusted with relation to the hydrostatic head of paste-like material within the body of the distributing head assembly 16 so that dripping is substantially entirely eliminated, i.e., the forces on the liquid (e.g., capillary force, viscosity, etc.) in the tubes exceed the hydrostatic head forces imposed by the length of column of fluid. To this end, the spouts 86 project through the spout holder plate 98 into the cavity within the head 16 such that the hydrostatic head is reduced to a minimum without interferring with the flow and distribution of material to the outer periphery of the distributing head 16 and its positive expulsion through the orifices 96 in the spouts 86. While it may appear that stationary bodies of paste may be formed within the head, it should be borne in mind that the equipment is washed periodically. About 1 inch of tube length has been found useful with a conventional pizza pie tomato paste. In order to prevent dripping of tomato paste of the type used for filling pizza pie shells, the length of the spouts 86 should exceed the vertical hydrostatic head within the distributor head 16 and be several times the diameter of the orifice or I.D. of the opening. The particular dimensions, of course, depend on the particular paste foodstuff employed.

Although the embodiment shown in the annexed drawings is a preferred embodiment of the invention, it is clear that other modes of achieving the desired objectives of nondrip as well as adequate shell surface coverage may be employed.

THE PASTE-DISPENSING PUMP

Referring now more particularly to FIG. 5, there is here shown on an enlarged scale a cross-sectional view of a variable stroke single-acting paste dispensing pump useful in accordance with the present invention. Accordingly, there is provided a flanged base 110 having integral therewith mounting flange 72 suitably drilled as at 112 for mounting in abutting relation with the base 66 of vessel 18 (FIG. 2). A suitable sealing ring such as O-ring 114 is provided for sealing the interface between the base 110 and the platform 66. There is also provided a valve body 116 suitably tapped for fastening to the base 110 by means of bolts such as bolt 118. The valve body 116 is suitably drilled to provide an axial bore 120 for receipt of the proximal extremity of a piston/cylinder assembly generally indicated at 122 and composed of a cylinder 124 having slidably movable therein paste pumping piston 126 carried on the distal extremity of a piston rod 128. The piston 126 includes a pair of opposed elastomeric ring seal members 130 and 132 adapted for sliding and sealing engagement with the internal surface of cylinder 124. Retaining plates 134 and 136 coact between the piston rod 128 and a piston body 138 to secure the seals 130 and 132 to the rod 128. Retaining plate 136 is held in abutting relation against a shoulder 140 on rod 128 through the action of a nut 142 bearing against retaining plate 134 and piston body 138. The distal extremity 144 of piston rod 128 is suitably threaded to receive the nut 142.

The proximal extremity 146 of rod 128 is provided with a driving piston 148 suitably fixed thereto as by means of snap ring 150 coacting between the proximal extremity 146 of piston rod 128 and a retaining collar 152. The driving piston 148 is held in abutting relation with shoulder 154 by means of the snap ring 150 and the collar 152. An extension of the cylinder body 124 defines an isolated fluid motor drive chamber 160 closed at its outer extremity by means of end closure 162 and at its inner extremity by an internal, fixed end closure 164. The fixed end closure 164 is held in position intermediate the ends of the cylinder body 124 by means of locking rings 166 and 168 coacting in circumferential recesses 170 and 172, respectively, in the internal wall of cylinder 124. The fixed end closure 164 is suitably sealed with an O-ring 174 in sealing relation between the internal sidewall of the cylinder 124 and the fixed closure 164. The end closure 164 is provided with an axially extending bore 176 dimensioned for sliding coaction with the piston rod 128. A suitable bushing 178 and suitable ring seals such as seals 180 and 182 permit axial movement of the rod 128 and effectively seal the chamber 160 from an auxiliary chamber or trap chamber 184. In order to prevent leakage of compressed air past the driving piston 148, there is provided a peripheral seal 186 coacting between the piston 148 and the sidewall of cylinder 124.

The internal fixed end closure 164 for the fluid motor chamber 160 is provided with a radial port 188 which communicates with an axially extending bore 190 communicating between the radial port 188 and the chamber 160. In like manner, the end closure 162 is provided with an axially extending bore 192 communicating with a radially extending port 194. Tapped holes 196 and 198 extend through the sidewall of cylinder 124 for threaded attachment of compressed air lines adapted to transport air under pressure into and out of chamber 160, thereby effecting movement of driving piston 148 in a programmed reciprocal fashion within fluid motor chamber 160.

As indicated above, stroke adjusting means are provided and include a threaded adjusting pin 62 extending through the outer end closure 162 for abutting engagement with the proximal extremity 146 of the piston rod 128. Lock nut 200 coacts between the threads of stroke adjusting pin 62 and a lock washer 202 to fix the penetration of the abutment face 204 into chamber 160. As indicated above, indexing means are provided to aid in setting the penetration of abutment face 204, thereby regulating the size of the charge to be expelled through distributing head 16. The end closure 162 for chamber 160 is held in position by means of retaining ring 206 coacting between the closure 162 and a recess 208 in the sidewall 156. A suitable ring seal such as O-ring 210 confines compressed air within the chamber 160. In one specific embodiment of the variable stroke pump illustrated in FIG. 5, the maximum stroke is 3⅝ inches and the minimum stroke is 1⅝.

Where compressed air is used as the fluid under pressure for reciprocably moving driving piston 148 within chamber 160, a problem may be encountered with gas-entrained oil from the compressor. To ensure against contamination of the paste material being dispensed by such gas-entrained oil, there is provided an auxiliary fixed bulkhead 212 fixedly retained within the cylinder 124 by means of retaining rings 214 and 216 coacting in circumferential recesses 218 and 220, respectively. When utilized, the fixed bulkhead 212 also serves as the inner end closure for the pumping chamber 226. Again, suitable ring seals 222 and 224 are provided to effect a seal between the sliding piston rod 128 and the fixed bulkhead 212. The fixed bulkhead 212 and the fixed plug 164 define a fixed volume auxiliary chamber 184 which serves to trap any oil which may escape past the O-ring 174 and past the seals 180 and 182.

A variable chamber 226 is therefore provided between the valve body 116 and the movable paste pumping piston body 138. Movement of the piston 138 within the chamber 226 causes valves within the valve body 116 to be actuated so as to fill chamber 226 and then dispense paste-like fluid in measured quantity. Accordingly, the valve body 116 is provided with a single-acting spherical inlet valve 228 adapted to seat against the valve seat 230 and being biased in a normally closed position by means of a spring 232. The spring 232 coacts between the valve 228 and a removable spring retaining sleeve 234 suitably threadably engaged in valve bore 236 in valve body 116. An inlet 238 to the valve bore 236 communicates between porting 240 suitably drilled within the base 110 and the valve bore 236. It will thus be seen that actuation of the paste pumping piston body 138 in an upward direction by means of the fluid motor at the proximal extremity of the piston rod 128 will cause the valve 228 to be unseated from the valve seat 230, overcoming the bias of the spring 232 and permitting fluid, e.g., paste-like material, to flow through the porting 240 into the inlet 238 past the valve seat 230 and into the valve bore 236 for entrance into the chamber 226 through the opening 242. Reversal of the movement of the piston 138, then, causes reseating of the valve 228 upon the valve seat 230, preventing escape of the fluid now in pumping chamber 226 therethrough.

In an oppositely acting manner, the valve body 116 is provided with a discharge opening 244 leading to a valve chamber 246. There is provided a valve 248 also spherical in shape adapted for seating coaction against valve seat 250 at the inner end of opening 224. Valve 248 is biased in a normally closed position by means of spring 252 coacting between the valve 248 and a spring retaining sleeve 254. Sleeve 254 extends into the valve chamber 246 and is threadedly engaged with the valve body 116. The sleeve 254 having an opening 256 at the outer end thereof communicates with suitable fluid conducting openings 258 and 260 within the base 110.

Thus, when the paste pumping piston head 138 is moved in a dispensing direction (downwardly in FIG. 5), spherical valve 228 is seated, blocking flow through the valve bore 236, and the valve 248 is unseated from valve seat 250, overcoming the bias of spring 252 and allowing fluid to by-pass the valve 248 into the sleeve 254 for expulsion through the opening 256 and through the base 110 which communicates as above indicated with the distributing head 16. It may be found desirable in practice to inhibit dripping of paste material by moving piston head 126 slightly in a reverse direction to impose a "negative" pressure on the paste retained in the head 16.

In order to protect the fluid motor inlet and exhaust lines (not shown), an auxiliary shell 262 sealed or otherwise bonded to the base 110 and seated on shoulder 264 is provided. The auxiliary shell 262 is desirably coextensive in length with the pump body and serves as a coffer dam to isolate the pump from the surrounding paste-like material contained in vessel 18 (FIG. 2).

THE CHEESE GRATING STATION

Figure 6:
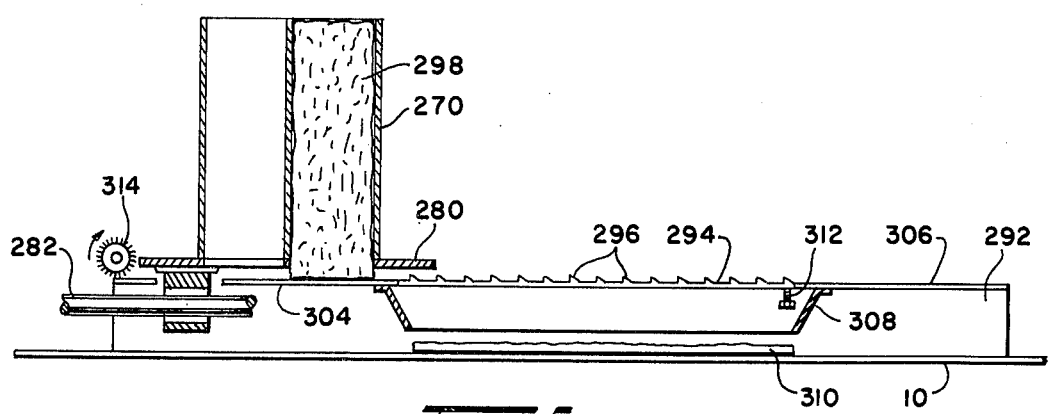
FIG. 6 is a schematic and diagrammatic partially cut-away cross-sectional view of a station for applying a grated ingredient to pastry goods characterized by a movable gratable material holder and a stationary grater in material-applying relation to an indexing conveyor.

FIGS. 6 and 7 show a cheese grating apparatus characterized by a cheese holder 270 conveniently although not essentially compartmented by dividers, e.g., dividers 272, 274, 276, and 278, formed conveniently of plastic materials such as polymethylmethacrylate or Plexiglass. The multichambered holder 270 is conveniently mounted on a plate 280 which is in turn mounted for sliding coaction on guide bars 282 and 284 conveniently supported from the framework 11 of the conveyor 10. Reciprocating movement of the plate 280 is achieved by means of a pneumatic motor 286 having one end (not shown) secured to a bracket which is in turn mounted on the framework 11 of the conveyor 10 and a projecting rod 288 for engagement with block 290 integral with the plate 280. Supported from the framework 11 of the conveyor 10 by means of side rail such as side rail 292 is a stationary grate 294 having a plurality of upstanding cusps 296 projecting upwardly therefrom for interception with the cheese bricks, e.g., cheese brick 298. The surface of the grate 294 and the bottom of the holder 270 define a substantially horizontal interface along which relative movement occurs. The grate 294 is desirably removable from the framework for cleaning purposes and is accordingly removably disposed in a recess 300 a horizontally disposed plate 302 carried by the side rails 292. Plate 302 is continuous and coplanar with the plane of the insert 294, a leading planar extension 304, and a trailing extension 306 thereof serving to retain the cheese blocks within the holder 270 when the position of the holder 270 is at the extremities of the path of relative movement where the cheese blocks 298 are out of contact with the grate 294. In underlying relation with the grate 294 and suitably secured to the extensions 304 and 306, there is provided a funnel-form circular chute 308 configured for confining the distribution of the grated cheese to a circular pattern such as illustrated in FIG. 6 wherein pizza shell 310 is shown in underlying indexed position therebelow. Chute 308 may be exchanged for varying diameter chutes or different configurations, e.g., square, if desired.

It has also been found that means for providing an upward incline to the grate 294 by slightly elevating the trailing edge thereof aids in the efficiency with which cheese is removed from the lower end of the block 298. To this end, an adjusting screw 312 may be provided to impose a very slight incline on the grate 294. It has also been found desirable although not essential to provide a rotating brush along the trailing edge of the plate 280 for clockwise rotation and extending across the widest extension of the cusps 296 in the removable grate 294. When cheese is grated in the manner indicated above, a very slight hooked lip is formed in the cheese strand which overlaps and hooks upon the topmost portion of the cusps 296. If a brush 314 of the type above described is employed, the tendency of strands of grated cheese to become hooked and suspended from the cusps 296 is minimized and the uniformity of distribution on the shells, e.g., shell 310, is improved.

Movement of the holder 270 on the slideways 282 and 284 by means of the pneumatic motor 286 is sequenced in such a way that movement thereof is prevented until a pastry shell, such as pastry shell 310, is properly stationarily located under the chute 308. Thereafter, the holder moves substantially horizontally across the stationary grate 294 toward and onto the planar trailing extension 306 whereby cheese is shredded from the bricks 298 passing through the perforations of the cusps 296 and falls through the chute 308 in confined manner onto the circular surface of the shell 310. Upon completion of the cycle, the holder 270 is returned to the original position such as shown in FIGS. 6 and 7 above the planar leading extension 304 to await a signal to repeat the grating operation.

THE SLICED SAUSAGE APPLYING STATION

Following the application of the grated cheese, the shells, e.g., shell 310, are indexed to a position for receiving sausage slices. The sausage filling station 47 is diagrammatically and schematically shown in FIGS. 8 and 9. There is provided a sausage holder 320 conveniently formed of a plurality of upstanding clear plastic tubes open at each end, e.g., tubes 322, disposed in a hexagonal pattern or array such as best shown in FIG. 9. The tubes are supported in a stationary holder 324, the location of which relative to indexing belt 10 is adjustable as by means of elongated slots 323, stud bolts 325, and wing nuts 327. The stationary holder 324 is provided with a transverse horizontally disposed slot 326 in which is translatably mounted an apertured sausage gripping plate 328. The gripping plate 328 comprises holes 330 bored therethrough corresponding to the array of sausage tubes 322 and having on the trailing edge thereof serations 332 for limited penetration into the sausage shaft, e.g., shaft 334 in FIG. 8. To effect transverse movement of the gripping plate 328, it is convenient to provide a flange member 336 for engagement with the distal extremity of piston rods 338 extending from pneumatic motors 340 of relatively short stroke. It has been found desirable in handling sausage meat in the manner herein described to provide a gripping means against retrograde movement during slicing to restrict the tendency of the sausage shaft to rise in the tubes 322 during the slicing operation. Reverse movement of the gripping plate 328 allows the sausage shafts, such as shaft 334, to fall by gravity to a resting position on a translatable deck 342 which is normally in underlying position beneath the array of tubes 322.

In order to provide the slices of sausage meat, there is provided a movable slicing assembly mounted for reciprocal movement along the guide rods 282 and 284 which, as previously indicated in connection with the discussion of FIG. 7, are stationarily supported from the framework of conveyor 10. There is provided a table body 344 which is continuous with the translatable deck 342 and upon which is mounted a motor 346 for driving a circular knife 348 by means of a belt 350 coacting between a drive pulley 352 and a driven pulley 354. In the embodiment shown in FIGS. 8 and 9, the periphery of the knife wheel 348 is a tapered edge defining an included angle of from 5° to 10° and is driven at a peripheral speed of 10 feet per second or more. The translatable deck 342 moves along the guide rods 282 and 284 with the table 344, whereby the lower ends of the sausages slide in supported relation upon the deck 342 when it is translated. A slit 356 of semicircular configuration in the table 344 enables the slices of sausage to escape through the table 344 and by means of guide chute 358 to be deposited in predetermined pattern corresponding to the array upon the surface of the pastry shell, e.g., shell 360. The chute 358 preferably includes a semicircular downwardly sloped chute portion 362 and parallel upstanding segregating ribs 364 positioned to traverse with the deck 342 a straight line path between projections of the rows of sausage tubes 322. The ribs 364 bracket on each side each of the longitudinal rows of sausage and prevent lateral displacement of the sausage slices due to the configuration of the chute 358. The chute portion 362 provides a sliding surface over which the severed sausage slices will fall for disposition in the predetermined pattern on the surface of the pizza shell 360. While it has not been found essential, it may be found convenient to perforate the surface of the sloped chute portion 362 through which to pass air under a slight positive pressure to provide an air cushion and thereby reduce the sliding resistance of the individual slices in traversing the chute portion 362. In general, the maximum size of pizza shells currently produced is 14 inches and the smallest, approximately 6 inches, with intermediate sizes. To accommodate the smaller sizes, it is only necessary to limit the tubes 322 which are filled with the sausage meat.

Accordingly, at this station when a partially filled pizza shell, e.g., shell 360, is in position beneath the columnar sausage tubes 322, a pneumatic motor, for example pneumatic motor 366, is actuated, forcing the piston rod 368 outwardly therefrom to drive against the abutment 370 and effect movement of the motor/knife assembly into slicing relation with the sausages supported on translatable deck 342. The sausages are held against elevation due to the slicing action from a rotating knife 348 by means of gripping plate 328 actuated by air motors 340 in timed sequence with the movement of table 344. After the knife has traversed the entire array of tubes 322, it is pneumatically retracted to the original position shown in FIGS. 8 and 9 and to await a signal that another pizza shell is in position to receive the sliced sausage meat.

The apparatus shown in FIGS. 1 – 9 inclusive and including the individual stations herein described is capable of producing filled pizza shells with fillings of tomato paste, grated cheese, and pepperoni at a rate which approaches 1,800 per hour. This can be accomplished with relatively few attendants whose principal occupation will be to maintain the cheese holders 270 filled with brick cheese and the pepperoni tubes 322 filled with sausage meat. Another attendant will receive partially baked pizza shells from a source thereof and, using the locator 12 for proper placement, deposit the shell on the conveyor belt 10 while it is stationary. After completion of the filling operations at the successive stations, the filled shells are then picked up by a third operator for further processing, e.g., packaging and/or freezing.

Although the invention has been described in reference to the production of filled pizza shells, it will be understood that one, some, or all of the stations described may be used in various arrangements. For example, in chocolate creme pie filling, a pie shell may be first filled with chocolate creme from the paste dispensing apparatus herein described and secondly topped with grated coconut. The sausage slicing apparatus is readily adapted to slicing vegetables or fruit, e.g., bananas for topping banana creme pie. Thus, various combinations of the individual stations with the indexing conveyor assembly may be made as a given pastry product may require.

What is claimed is:

1. Grated foodstuff dispensing means comprising in combination:
    a. means for holding a gratable foodstuff;
    b. a grate having a leading edge and a trailing edge and relatively translatable with respect to said holding means;
    c. means for relatively translating said grate and said holding means to and fro along a substantially horizontal interface; and
    d. means for upwardly inclining the trailing edge of said grate.

2. Grated foodstuff dispensing means in accordance with claim 1 wherein the holding means comprises a plurality of vertically disposed contiguous chambers, each open at each end.

3. Grated foodstuff dispensing means in accordance with claim 1 wherein the holding means are slidably mounted on guide bars and the grate is stationarily mounted relative to said holding means.

4. Grated foodstuff dispensing means in accordance with claim 1 wherein the grate is removably mounted in a stationary table having extended leading and trailing planar surfaces for underlying, respectively, the holding means at the beginning and the end of said interface.

* * * * *